United States Patent [19]

Fournier

[11] Patent Number: 4,511,152

[45] Date of Patent: Apr. 16, 1985

[54] SELF-REINFORCED FACE SEAL

[75] Inventor: Paul J. E. Fournier, Jackson, Mich.

[73] Assignee: Aeroquip Corporation, Jackson, Mich.

[21] Appl. No.: 578,137

[22] Filed: Feb. 8, 1984

[51] Int. Cl.[3] .......... F16J 15/10

[52] U.S. Cl. .......... 277/207 A; 277/206 R; 277/207 R; 277/215

[58] Field of Search .......... 277/205, 206 R, 206 A, 277/207 R, 207 A, 207 B, 212 R, 212 C, 215

[56] References Cited

U.S. PATENT DOCUMENTS

| | | | |
|---|---|---|---|
| 1,701,326 | 2/1929 | Johnson | 277/206 |
| 1,899,695 | 2/1933 | Johnson | 277/206 |
| 2,465,175 | 3/1949 | Schwartz et al. | 288/5 |
| 2,665,151 | 1/1954 | Fisler et al. | 288/16 |
| 3,158,379 | 11/1964 | Nava et al. | 277/206 |
| 3,390,890 | 7/1968 | Kurtz | 277/205 |
| 3,554,569 | 1/1971 | Gorman | 277/205 |
| 3,680,894 | 8/1972 | Young | 277/206 X |

FOREIGN PATENT DOCUMENTS

| | | | |
|---|---|---|---|
| 275810 | 10/1964 | Netherlands | 277/206 |

*Primary Examiner*—Robert S. Ward
*Attorney, Agent, or Firm*—Beaman & Beaman

[57] ABSTRACT

A face seal having lateral portions bridged by segments homogeneously defined by the elastomer material of the seal. The circumferentially spaced bridge segments define voids between the lateral portions providing clearance to accommodate the seal material during swelling, and also permit the seal to be manufactured slightly "oversize" to compensate for shrinkage without adversely affecting its sealing abilities and operation.

4 Claims, 8 Drawing Figures

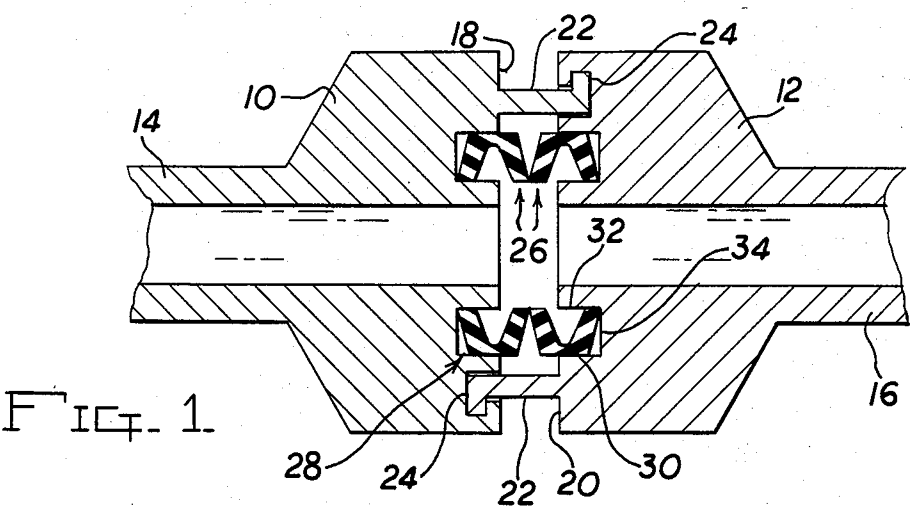
Fig. 1
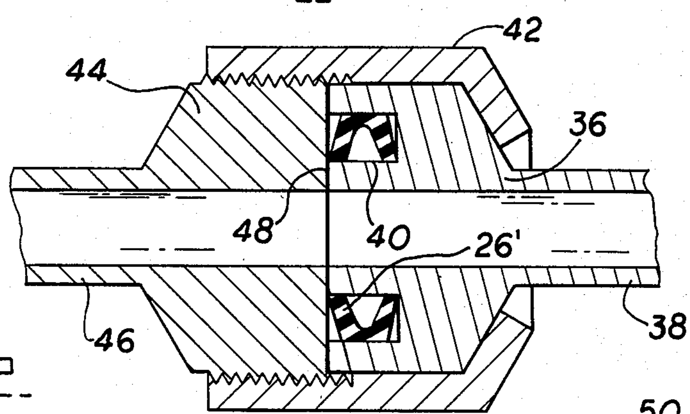
Fig. 2
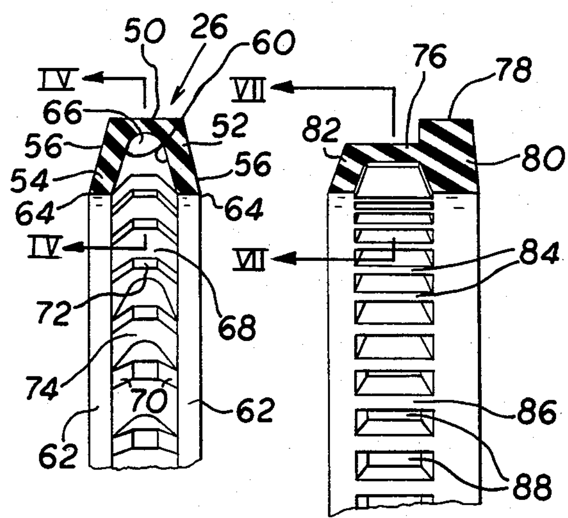
Fig. 3
Fig. 6
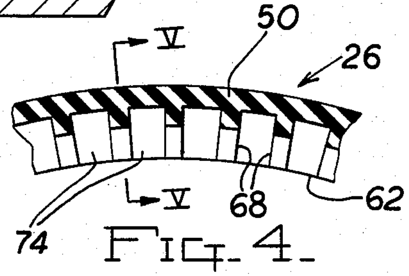
Fig. 4
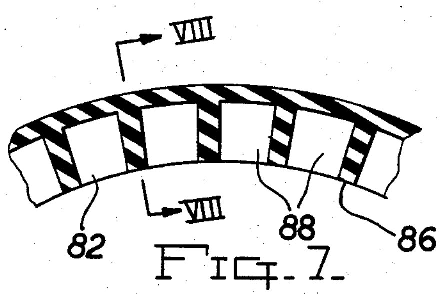
Fig. 7
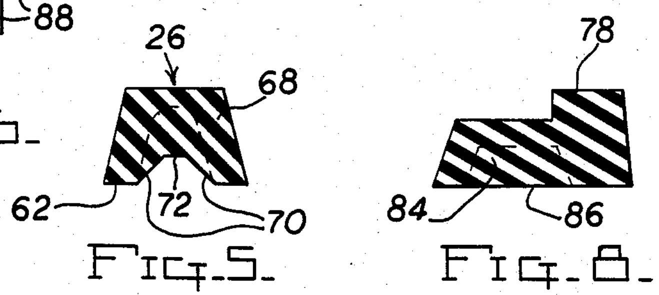
Fig. 5
Fig. 8

SELF-REINFORCED FACE SEAL

BACKGROUND OF THE INVENTION

Face seals are utilized to seal components having opposed surfaces wherein the seal is sandwiched between the opposed surfaces or "faces" and sealing occurs at the lateral portions of the annular seal body and the sealing forces are axial with respect to the body configuration.

In installations utilizing face seals the components being coupled employ coupling or attachment elements for maintaining the coupled components in a face-to-face relationship, and if elastomer swelling has caused the axial dimension of the face seal to increase, the coupling components cannot be interengaged, or if swelling has occurred after the coupling has been interconnected, uncoupling of the components becomes very difficult. Seal swelling occurs with certain types of fluids, such as aircraft fuels, and few seal compositions are impervious to swelling.

If the dimensions of a face seal are minimized in the axial direction to reduce swelling problems shrinkage of the seal, or tolerance variations in the coupling components, will prevent a fluid-tight seal from occurring. Accordingly, it will be appreciated that serious problems occur with face seals due to changes in axial dimension resulting from swelling or from shrinkage.

It is an object of the invention to produce a face seal which compensates for elastomer swell, and does not require additional components to accommodate dimensional changes.

An additional object of the invention is to provide an elastomer face seal which is self-energized in that only the seal material itself maintains the seal lateral portions in sealing engagement with the faces to be contacted, and no metal or elastic internal rings are needed for seal energization.

Yet another object of the invention is to provide an elastomeric face seal having voids so located as to accommodate the seal material during swelling without adversely affecting the operational characteristics, and wherein the need for energizing components is eliminated.

In the practice of the invention the annular face seal consists of an elastomeric annular body having a base portion from which lateral portions extend in a common radial direction. A plurality of bridges are homogeneously defined of the seal material and extend between the lateral portions for reinforcing and locating the lateral portions. The bridge segments are circumferentially spaced to provide clearances therebetween for accommodating the seal body material during swelling, and the bridges energize the seal to produce the desired resistance to axial forces necessary to achieve the required operation.

BRIEF DESCRIPTION OF THE DRAWINGS

The aforementioned objects and advantages of the invention will be appreciated from the following description and accompanying drawings wherein:

FIG. 1 is a simplified, elevational, diametrical, sectional view of a coupling utilizing face seals in accord with the invention in a double seal arrangement, FIG. 2 is a simplified, elevational, diametrical, sectional view of a coupling utilizing a single face seal in accord with the invention, FIG. 3 is a sectional, elevational view of the seal of FIGS. 1 and 2, FIG. 4 is a detail, side elevational view as taken along Section IV—IV of FIG. 3, FIG. 5 is an elevational, sectional view as taken along Section V—V of FIG. 4, FIG. 6 is a sectional, elevational view of another embodiment of face seal in accord with the invention, FIG. 7 is an elevational, sectional view of the seal of FIG. 6 taken along Section VII—VII, and FIG. 8 is an elevational, sectional view as taken along Section VIII—VIII of FIG. 7.

DESCRIPTION OF THE PREFERRED EMBODIMENTS

A typical, simplified coupling relationship is shown in FIG. 1 wherein two identical coupling halves 10 and 12 each associate with their hose or tube conduits 14 and 16 and are maintained in a face-to-face relationship wherein the faces 18 and 20 are axially opposed. While a variety of types of connecting devices may be used to hold the coupling halves in a connected relationship, one type of connection may be of the bayonet type wherein axially extending projections or ribs 22 are received within recesses 24 formed in the coupling parts, and a relative rotation of the coupling halves about their axis interlocks the projections within their recesses maintaining the faces 18 and 20 in parallel relationship and slightly spaced from each other. In FIG. 1 the spacing between the faces 18 and 20 is exaggerated for purpose of illustration.

Sealing between the coupling halves 10 and 12 is produced by a pair of annular face seals 26 of identical construction. Each seal is received within an annular recess 28 defined by an outer diameter 30, an inner diameter 32, and a radial bottom surface 34. The "outer" lateral portions of the seal engage each other, while the inner lateral portions seal against their associated recess bottom surface 34. In this manner, the seals render the connection between the coupling halves 10 and 12 fluid tight.

In FIG. 2 the coupling body 36 is associated with the conduit 38 and includes an annular recess 40 similar to that previously described. The seal 26' is received within the recess 40 in the manner as described above. A connector nut 42 is rotatably mounted upon the body 36 and is internally threaded to mate with the external threads defined upon the opposed coupling body 44 associated with conduit 46.

The coupling body 44 includes a radial face surface 48 engaged by the "outer" lateral portion of the seal 26', and in this embodiment only a single face seal is required to establish sealing between the coupling bodies.

The configuration of the seal 26 and 26' is best represented in FIGS. 3–5. The seal comprises an elastomeric body formed of a material such as nitrile, and the body includes a base portion 50 from which depend lateral portions 52 and 54 in a common radial direction. The lateral portions are defined by substantially parallel outer and inner surfaces 56 and 60, respectively, and as will be appreciated from FIG. 3, the lateral portions slightly diverge in an inward radial direction.

The lateral portions are cantilevered each having a free end wherein the free end is defined by a substantially cylindrical surface 62 which intersects the outer surfaces 56 to form "lips" 64 to produce sealing in the known lip seal manner as well as produce a high pressure contact due to the "sharp" edge.

The "valley" 66 between lateral portions 52 and 54 at the base portion is concave, and the opposed lateral portion inner surfaces 60 are interconnected by a plurality of circumferentially spaced bridge segments 68. The bridges 68 are homogeneously formed of the material of the molded seal body, and are inwardly defined by diverging surfaces 70, and a cylindrical central surface 72, FIG. 5. The circumferential spacing of the segments, which is approximately 5°, produces a plurality of circumferentially spaced voids 74, FIG. 4, and it is these voids which provide the room to accommodate swelling of the seal body material.

The mode of installation of the seals 26 and the coupling halves 10 and 12 of FIG. 1, or the coupling of FIG. 2, will be readily appreciated from the drawing. In the embodiment of FIG. 1 the outer lip edges 64 of the two seals 26 engage to seal with respect to each other, and the engagement of the seal inner lip with the recess bottom surface 34 forms the direct seal with respect to the associated coupling half.

In the embodiment of FIG. 2, the "outer" lateral side 56 and lip 64 engages the coupling face 48 to seal the coupling parts.

As previously discussed, face seals installed in the manner illustrated in FIGS. 1 and 2 may swell in an axial direction due to reaction with the fluid within the coupling. With the seal of the invention such swelling does not cause such internal pressures within the seal as to prevent uncoupling or coupling, due to the fact that the presence of the voids or clearances 74 provides space for the body material to be internally displaced.

Also, the construction of the seal of the invention permits the seals to be constructed slightly "oversize" in an axial direction whereby shrinkage of the seal due to reaction with the fluid being handled, or other factors, does not destroy the engagement of the seal with another seal, or the associated coupling face.

As the bridge segments 68 are homogeneous with the seal body material and extend across the axial width of the seal, as will be appreciated from FIG. 5, the bridge segments cause the seal to be self-energized in an axial direction eliminating the need for an internal metal spring or O-ring, as is often used with more conventional face seal constructions.

A slightly revised face seal configuration from that previously described is illustrated in FIGS. 6–8, and in this embodiment the base portion 76 includes an annular radially extending base or projection 78 wherein the seal may be located within a larger recess within the associated coupling than the embodiment of FIGS. 3–5.

In this embodiment the lateral portion 80 is of greater axial dimension than the lateral portion 82, and the bridge segments 84 each include an inner surface 86 which is coincident with the inner end surfaces of the lateral portions 80 and 82.

The embodiments of FIGS. 6–8 operate in a manner identical to that of FIGS. 3–5, and the voids 88 permit the seal to swell without creating excessive axial pressures, or permit the seal to be manufactured slightly oversize to compensate for shrinkage.

It is understood that various modifications to the inventive concepts may be apparent to those skilled in the art without departing from the spirit and scope of the invention.

I claim:

1. A self-aligning face seal characterized by its ability to compensate for swelling in an axial direction comprising, an annular molded body of elastomeric material having an axis, a base portion, axially spaced cantilevered lateral portions extending in a common direction from said base portion, each lateral portion including a free end, an outer side surface, an inner surface, and an end surface at the lateral portion free end intersecting said outer and inner surfaces, said lateral portions being axially spaced and said outer side surfaces being obliquely oriented to said body axis whereby the axial spacing between said free ends is greater than the axial dimension of said base portion, and a plurality of circumferentially spaced axially extending bridge segments homogeneously defined of said body material interconnecting said lateral portions radially extending between said base portion and said free ends reinforcing said lateral portions against axial compression, the voids between said segments accommodating swelling of the body material in an axial direction.

2. In a self-reinforced face seal as in claim 1, said bridge segments each being defined by radially extending circumferentially spaced sides and a free edge disposed in the direction of said lateral portions free ends, said free edge being of a concave configuration.

3. In a self-reinforced face seal as in claim 2, said lateral portions being of identical axial dimension and configuration.

4. In a self-reinforced face seal as in claim 1, one of said lateral portions being of greater axial dimension than the other lateral portion and including an enlarged radially extending boss radially extending beyond said base region.

* * * * *